(12) United States Patent
Nakamura et al.

(10) Patent No.: US 6,813,605 B2
(45) Date of Patent: Nov. 2, 2004

(54) METHODS AND SYSTEMS FOR SELLING VOICE DATA

(75) Inventors: Hirotaka Nakamura, Mizuho-machi (JP); Eiji Nakazawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 521 days.

(21) Appl. No.: 09/918,406

(22) Filed: Jul. 30, 2001

(65) Prior Publication Data

US 2002/0022959 A1 Feb. 21, 2002

(30) Foreign Application Priority Data

Aug. 9, 2000 (JP) ........................................ 2000-240676

(51) Int. Cl.⁷ .............................................. G01L 19/00
(52) U.S. Cl. ...................................... 704/270; 345/273
(58) Field of Search ................................ 704/250, 260, 704/270; 345/473

(56) References Cited

U.S. PATENT DOCUMENTS

| 4,884,972 A | * | 12/1989 | Gasper ........................ 434/185 |
| 5,533,124 A | * | 7/1996 | Smith et al. .................. 705/57 |
| 6,289,085 B1 | * | 9/2001 | Miyashita et al. ....... 379/88.02 |

FOREIGN PATENT DOCUMENTS

JP       2001-189803 A   *   7/2001    ..........  H04M/3/487

* cited by examiner

*Primary Examiner*—Daniel D Abebe
(74) *Attorney, Agent, or Firm*—Frishauf, Holtz, Goodman & Chick, P.C.

(57) ABSTRACT

A voice expressed by a voice actor or actress to a look and behavior of a character is electronized into voice data. The voice data and character data are stored in an associated relationship in a server device of an enterprise. A list of voice data stored in the server device is sent to a user's information terminal over the Internet. At the user's request, the server selects corresponding voice data and sells it to the user. The server also sells image data of the character.

8 Claims, 10 Drawing Sheets

| | | | C |
|---|---|---|---|
| CHARACTER A | VOICE ACTOR OR ACTRESS Q | TERM | |
| DYNAMIC IMAGE 1 | VOICE 1 | BASIC IMAGE 1 | BASIC VOICE 1 |
| DYNAMIC IMAGE 2 | VOICE 2 | BASIC IMAGE 2 | BASIC VOICE 2 |
| DYNAMIC IMAGE 3 | VOICE 3 | BASIC IMAGE 3 | BASIC VOICE 3 |
| . | . | . | . |
| . | . | . | . |
| CHARACTER B | VOICE ACTOR OR ACTRESS R | TERM 1 | |
| DYNAMIC IMAGE 1 | VOICE 1 | BASIC IMAGE 1 | BASIC VOICE 1 |
| DYNAMIC IMAGE 2 | VOICE 2 | BASIC IMAGE 2 | BASIC VOICE 2 |
| . | . | . | . |
| CHARACTER B | VOICE ACTOR OR ACTRESS S | TERM 2 | |
| DYNAMIC IMAGE 1 | VOICE 1 | BASIC IMAGE 1 | BASIC VOICE 1 |
| . | . | . | . |
| CHARACTER C1 | VOICE ACTOR OR ACTRESS T | TERM 1 | |
| DYNAMIC IMAGE 1 | VOICE 1 | BASIC IMAGE 1 | BASIC VOICE 1 |
| . | . | . | . |
| CHARACTER C2 | VOICE ACTOR OR ACTRESS T | TERM 2 | |
| DYNAMIC IMAGE 1 | VOICE 1 | BASIC IMAGE 1 | BASIC VOICE 1 |
| . | . | . | . |

| CHARACTER A | VOICE ACTOR OR ACTRESS Q | TERM | C |
|---|---|---|---|
| DYNAMIC IMAGE 1 | VOICE 1 | BASIC IMAGE 1 | BASIC VOICE 1 |
| DYNAMIC IMAGE 2 | VOICE 2 | BASIC IMAGE 2 | BASIC VOICE 2 |
| DYNAMIC IMAGE 3 | VOICE 3 | BASIC IMAGE 3 | BASIC VOICE 3 |
| . | . | . | . |
| . | . | . | . |
| CHARACTER B | VOICE ACTOR OR ACTRESS R | TERM 1 | |
| DYNAMIC IMAGE 1 | VOICE 1 | BASIC IMAGE 1 | BASIC VOICE 1 |
| DYNAMIC IMAGE 2 | VOICE 2 | BASIC IMAGE 2 | BASIC VOICE 2 |
| . | . | . | . |
| CHARACTER B | VOICE ACTOR OR ACTRESS S | TERM 2 | |
| DYNAMIC IMAGE 1 | VOICE 1 | BASIC IMAGE 1 | BASIC VOICE 1 |
| . | . | . | . |
| CHARACTER C1 | VOICE ACTOR OR ACTRESS T | TERM 1 | |
| DYNAMIC IMAGE 1 | VOICE 1 | BASIC IMAGE 1 | BASIC VOICE 1 |
| . | . | . | . |
| CHARACTER C2 | VOICE ACTOR OR ACTRESS T | TERM 2 | |
| DYNAMIC IMAGE 1 | VOICE 1 | BASIC IMAGE 1 | BASIC VOICE 1 |
| . | . | . | . |

Please select a desired one from
among the following characters:

- Character A
- Character B
- Character C
- Character D
- . . .

FIG.9B

Please select an image and a voice:

- Create by yourself:
- Saluting image voice ("Good morning"):
- Saluting image voice ("Good morning. How are you?"):
- Self introduction voice ("I am ○○A born in...")
- . . .

FIG.9C

Please create a desired/image/voice
in the following process:

1. Please input an overall time within 60 seconds;
2. Select a first image;
3. Select intermediate images
   ("You can select up to five successive images.);
4. Please select the last image;
5. Please input letters representing a voice
   to be uttered by the images.

| CHARACTER B | PERSONAL INFORMATION | PURCHASE INFORMATION |
|---|---|---|
| DYNAMIC IMAGE 10 | VOICE 10 | ← |
| CHARACTER A | PERSONAL INFORMATION | PURCHASE INFORMATION |
| CHARACTER D | PERSONAL INFORMATION | PURCHASE INFORMATION |
| CHARACTER A | PERSONAL INFORMATION | PURCHASE INFORMATION |
| DYNAMIC IMAGE 11 | VOICE 11 | ← |
| | | |

WHEN SELECTED FROM PREPARED ONES

WHEN CREATED NEWLY

FIG.10

METHODS AND SYSTEMS FOR SELLING VOICE DATA

BACKGROUND OF THE INVENTION

1. Field of the Invention

The present invention relates to methods and systems for selling voice data, for example, of people of distinction, characters or personified animals who appear in an animation of television.

2. Description of the Related Art

In the past, many animations have been broadcasted in television broadcastes in which the voice of a character appearing in any particular animation is broadcasted as a unique voice uttered by a voice actor or actress. Especially, the voice of a character appearing in a popular animation has shaped the image of the character as one of means that cause the users to recognize the character.

The voice of the actor or actress who represents the voice of the character, however, changes with time (or age) or physically (for example, due to a disease in the actor's or actress's throat). Even if the character is undying, the actor or actress has a limited life. Thus, the actor or actress is compelled to change places with another frequently.

Thus, even when one wants to do some business or service, using the character or its unique voice, it is impossible to use the voice of the actor or actress that has a constant quality for a long time since it changes with time or physically. In addition, if the actor or actress dies, the actor's or actress's voice can not be used, undesirably.

SUMMARY OF THE INVENTION

It is therefore an object of the present invention to provide voice data selling methods and systems capable of selling constant quality voice data representing the character's voice expressed to a look and behavior of the character even when the voice of a particular actor or actress concerned changes with time or has a limited life.

In order to achieve the above object, according to the present invention there is provided a voice data selling method, comprising the steps of:

a voice data expressed by a specified person and appropriate for a predetermined character;

storing the the voice as voice data of the predetermined character in a storage device;

providing a user with the voice data as representing the voice of the predetermined character over a network; and selling the voice data to the user at the user's request.

Thus, the user can acquire a constant-quality character's voice any time.

BRIEF DESCRIPTION OF THE DRAWINGS

For a better understanding of the present invention, reference is made of a detailed description to be read in conjunction with the accompanying drawings, in which.

DESCRIPTION OF THE PREFERRED EMBODIMENT

Referring now to drawings, a preferred embodiment of the present invention will be described in detail.

Figure 1:
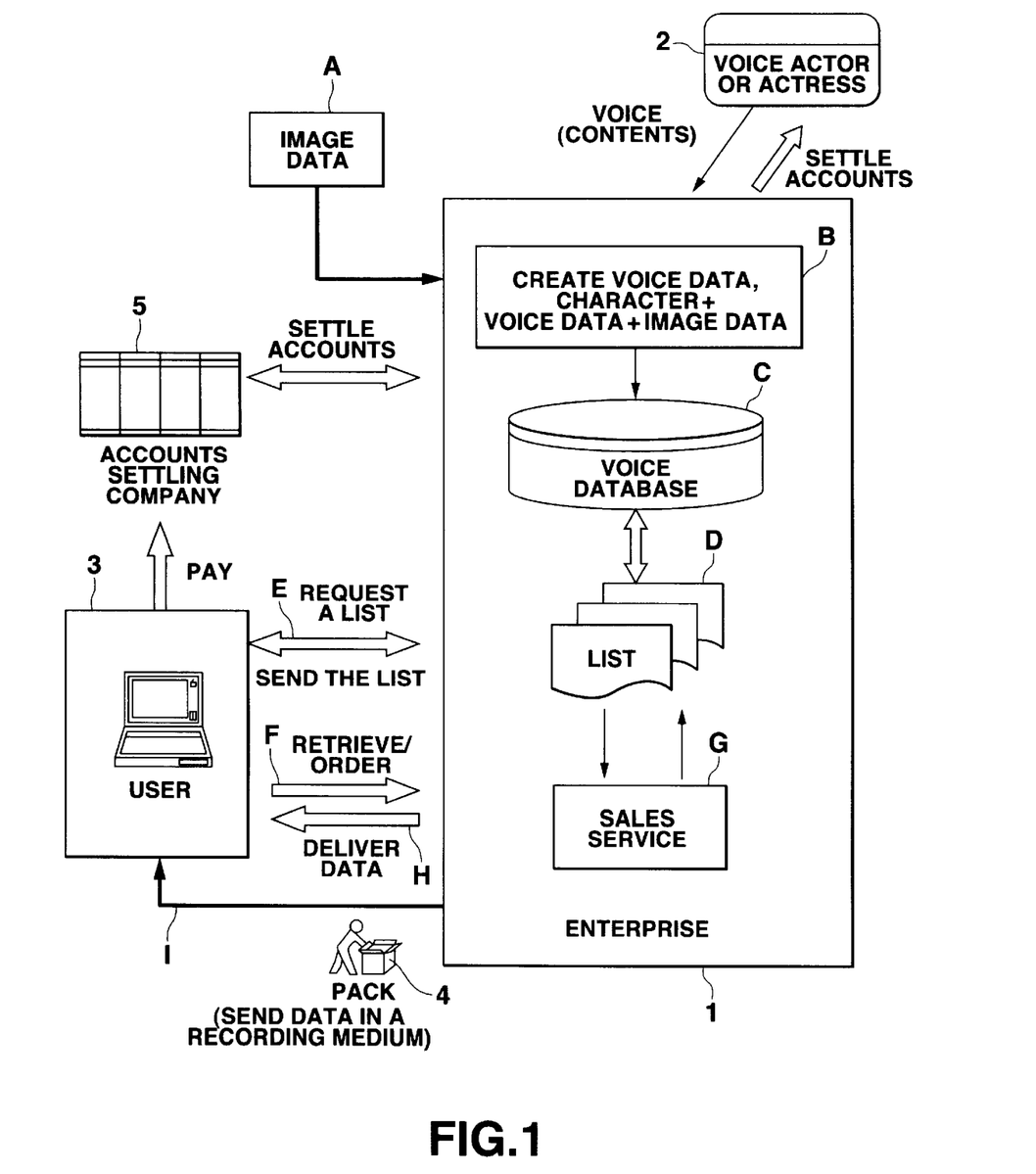
FIG. 1 illustrates a business model according to an embodiment of the present invention.

FIG. 1 illustrates a composition of a system as the embodiment of the present invention. In FIG. 1, it is assumed that an enterprise (service provider) 1 that sells voice data and image data beforehand obtains permission or contracts to engage in business, using image/voice data of a famous character from a person or company A that has a copyright or portrait right of the famous character.

The characters refereed to in the present embodiment include not only characters appearing in animations of television broadcasts or movies, but also animals, robots or fictions livings appearing in the animations. The characters are not limited to those appearing in the animations, but may be heroes or heroines appearing in well-known dramas performed by actors or actresses in televisions/movies. In addition, the characters may include famous actors/actresses, statesmen, television talents, singers and/or entertainers. They may also include famous commodities, animals and buildings. Image data of characters referred to in the present embodiment include image data representing the characters. For example, in the case of animation, they may include animation images themselves. In the case of heroes/heroines in dramas, commodities, animals and buildings, they may include their electronic photo image data or heroes' or heroines'/characters' portrait data, or animation image data representing the features of commodities, animals and buildings. After a user has obtained permission or contracted to use image data of a particular character, a voice of a voice actor or actress 2 (particular person) that dubs the voice of the character appearing in a movie or television broadcast and that is expressed to the expression/behavior of the character is electronized to voice data (B in FIG. 1). This data is then stored along with the character's image data in associated relationship in a storage device (voice database C in FIG. 1). A list of voice/image data associated with the character (D in FIG. 1) is presented to a user (customer) 3, for example, on a homepage of the enterprise 1 in the Internet via a network or by electronic mail or facsimile (E in FIG. 1). If the user requests to get voice/image data of a desired character representing its look/behavior (F in FIG. 1), the voice/image data is selected or created and provided to the user for pay (G in FIG. 1). The user may not order image data, but voice data alone.

The above service G includes delivery of voice/image data to the user 3 for pay via the network (H in FIG. 1), and if a quantity of voice data (and possibly image data) is large, such data is stored and sold in a recording medium 4 (for example, CD) (for example, in home delivery service I in FIG. 1). A method of settling accounts between the user 3 and the enterprise 1 includes payment into bank account, accounts settlement by registered mail for cash, and hand-over-on-receipt-of-payment. For example, in the example of FIG. 1, when voice data is delivered via the network, the user 3 settles accounts by card through the accounts settling company 5. When voice data is delivered in a recording medium 4, the user 3 receives the recording medium 4 on a hand-over-on-receipt-of-payment basis.

The voice actor or actress 2 utters the character's voice or provides contents "voices". When the actor or actress 2 utters the character's voice to a look or behavior of a particular character after he or she has contracted with the enterprise 1 for a particular matter of business, his or her voice is recorded (for example, in a recording studio), and converted to an electronic or digital voice data. This data is then stored in association with the character or its image data in the database C of the enterprise 1. The enterprise 1 pays the actor or actress 2 for offer of his or her voice, for example, each time the character's voice uttered by the actor or actress 2 is used by the user.

While in the above the image data is illustrated as being produced to a look and/or behavior of the character and the enterprise 1 is illustrated as contracting with the person or company A who has a copyright or portrait right of the character, for example, a third image creator may contract with the person or company A at the enterprise's request. The image data may be produced by the enterprise 1 itself.

There are many users 3, but one of them is shown in FIG. 1 for convenience' sake. The user 3 views the shopping picture of the homepage of the enterprise 1 via a network (for example, the Internet), as described above, and then requests a list of voice data of characters. When the user receives the list from the enterprise 1 via the network, the user searches the list for voice data representing a voice matching (and possibly image data expressing) a look and/or behavior of a desired character and then orders the data. The shopping picture of the homepage of the enterprise 1 composes a virtual shop for the characters' voice data. Thus, the user can request, receive and search the list for desired data and order the data on the homepage.

Figure 2:
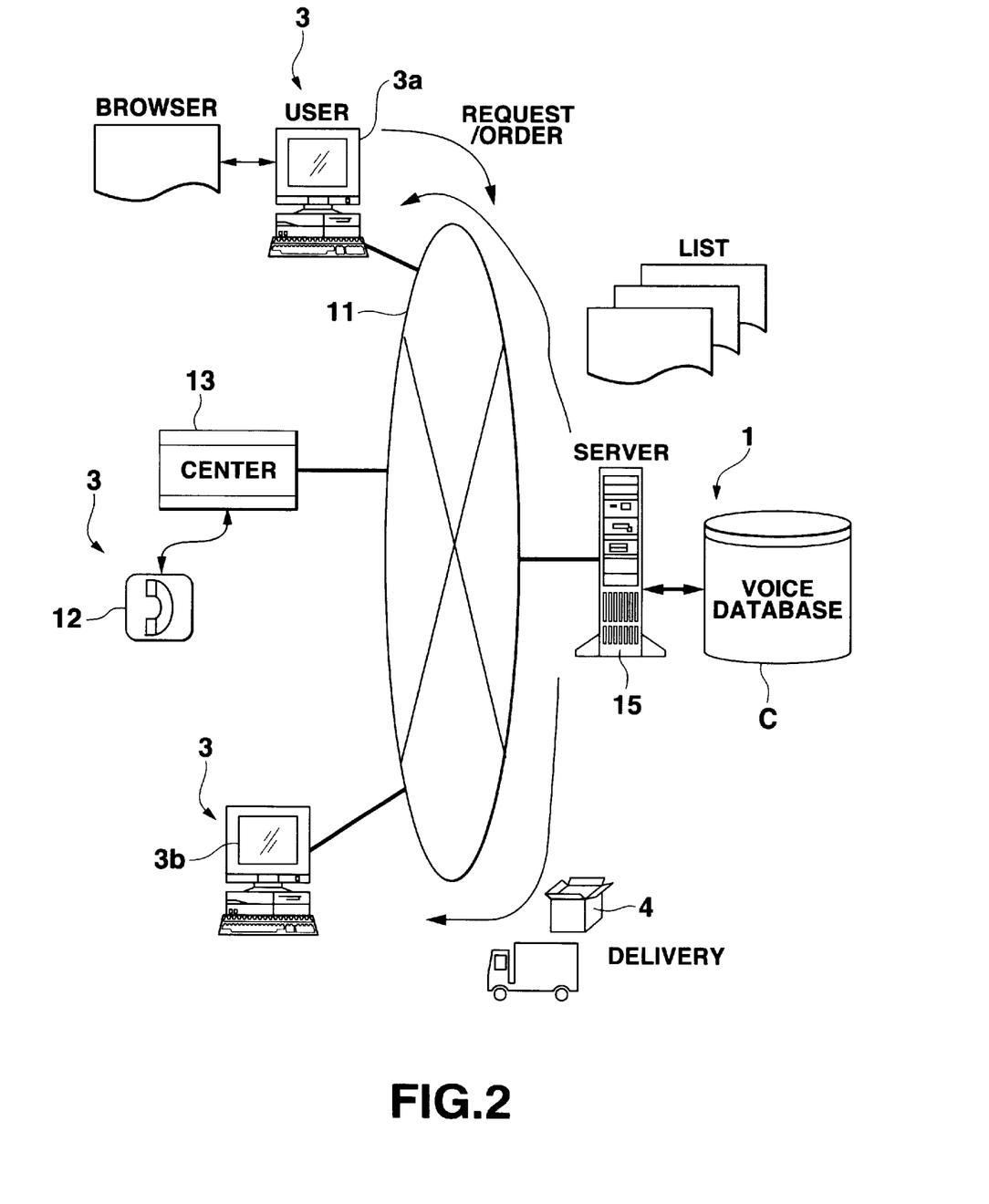
FIG. 2 illustrates a network of a sales system using the present invention.

FIG. 2 illustrates a network infrastructure to realize a business model. In FIG. 2, the user 3 has an information terminal (for example, a personal computer) 3a connectable to the Internet 11 as the network via telephone lines (not shown). The network is not limited to the Internet 11, but may be any communication network connectable between the user and the enterprise 1. It may be, for example, the telephone network (also involving facsimile usage), a so-called intranet, a LAN (Local Area Network) or the like.

The information terminal 3a has an environment for browser software execution and connection to the Internet 11 so that the user can request a list of voice data, order specified voice data, receive the voice data, and download program data received via the Internet 11. FIG. 2 also shows an information terminal 3b of a user 3 who desires voice data to be delivered in a recording medium 4. The user 3 can use a portable telephone 12 having an Internet function as the information terminal. In that case, the telephone 12 is connectable to the Internet 11 via a predetermined center 13.

If the network is the Internet, the information terminal of the user 3 may be any device that has an environment for connection to the Internet 11; that is, any one of a game device, a television receiver, an information terminal installed in a shop and a portable information device (PDA), connectable to the Internet. If the network is the telephone line network (where facsimile devices are also available), an intranet or LAN, the information terminal may be of any type as long as it is connectable to the network.

A server machine (hereinafter referred to as a server) 15 of the enterprise 1 is connected to the Internet 11. The server 15 has an environment for executing business rule software necessary for providing a sales service of voice data via the Internet to many users 3, and also has a voice database C containing data that places voice data, image data and characters in an associated state; personal information on the user 3 who purchased voice data, etc.

Figure 3:
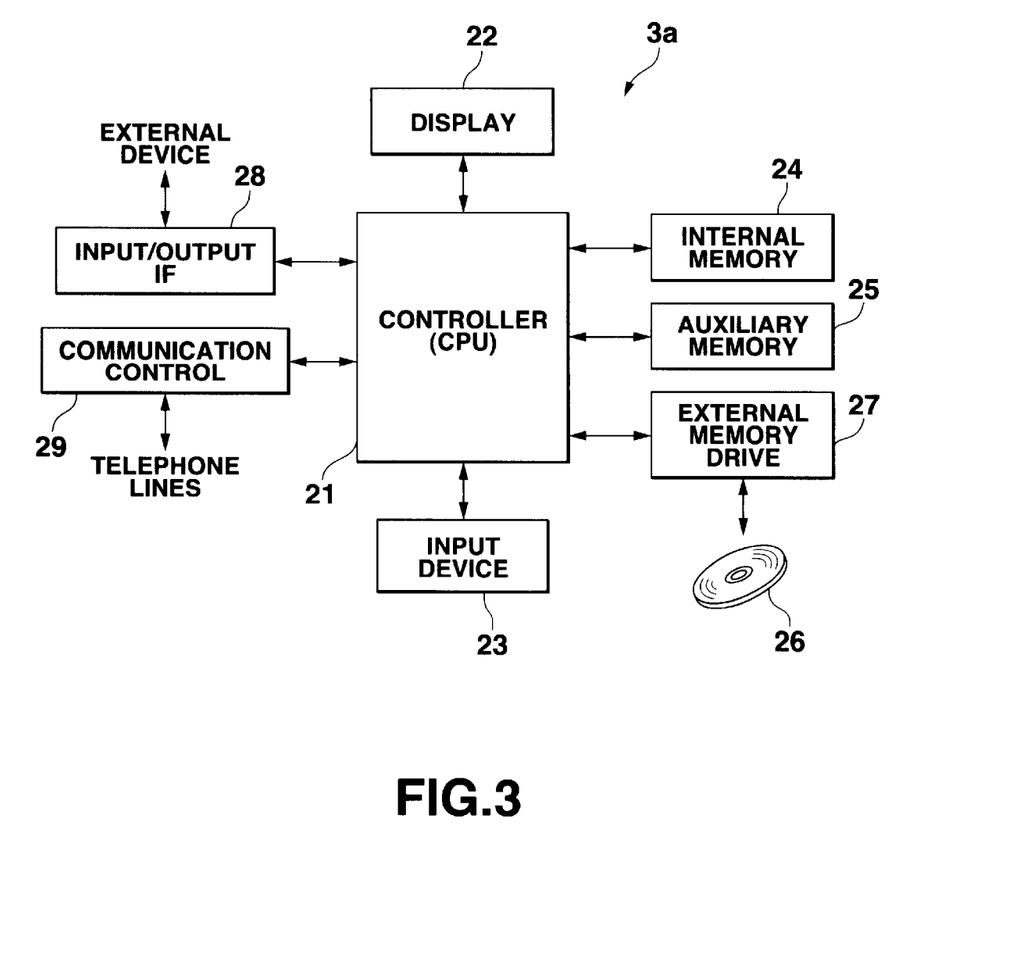
FIG. 3 illustrates a composition of an information terminal used by a user.

FIG. 3 illustrates a composition of the user's information terminal 3a. In FIG. 3, the information terminal 3a used is a personal computer, as described above. The information terminal 3a comprises a controller 21 that includes a CPU to which a display device 22 such as a CRT or a liquid crystal display, an input device 23 comprising a keyboard 3 or a pointing device such as a mouse, an internal memory 24 including a RAM, an auxiliary memory 25 such as a hard disk, an external memory drive 27 that drives an external recording medium 26 (for example, a CD-ROM, a CD-R or a CD-RW), an input/output interface (IF) 28 to which an external device such as a digital camera or a scanner is connected, and a communication control unit 29 such as a modem for connection to a predetermined provider over the telephone line network for constructing an environment for connection to the Internet 11.

The information terminal 3a can display a browser picture on the display device 22 by executing the browser software, and store in the auxiliary memory 25 or external recording medium 26 (for example, CD-RW) a program (a character voiced program shown in FIG. 6) for reproducing in the information terminal 3a a character and its voice and image represented by the purchased character data, and the purchased voice and image data associated with the character.

Figure 4:
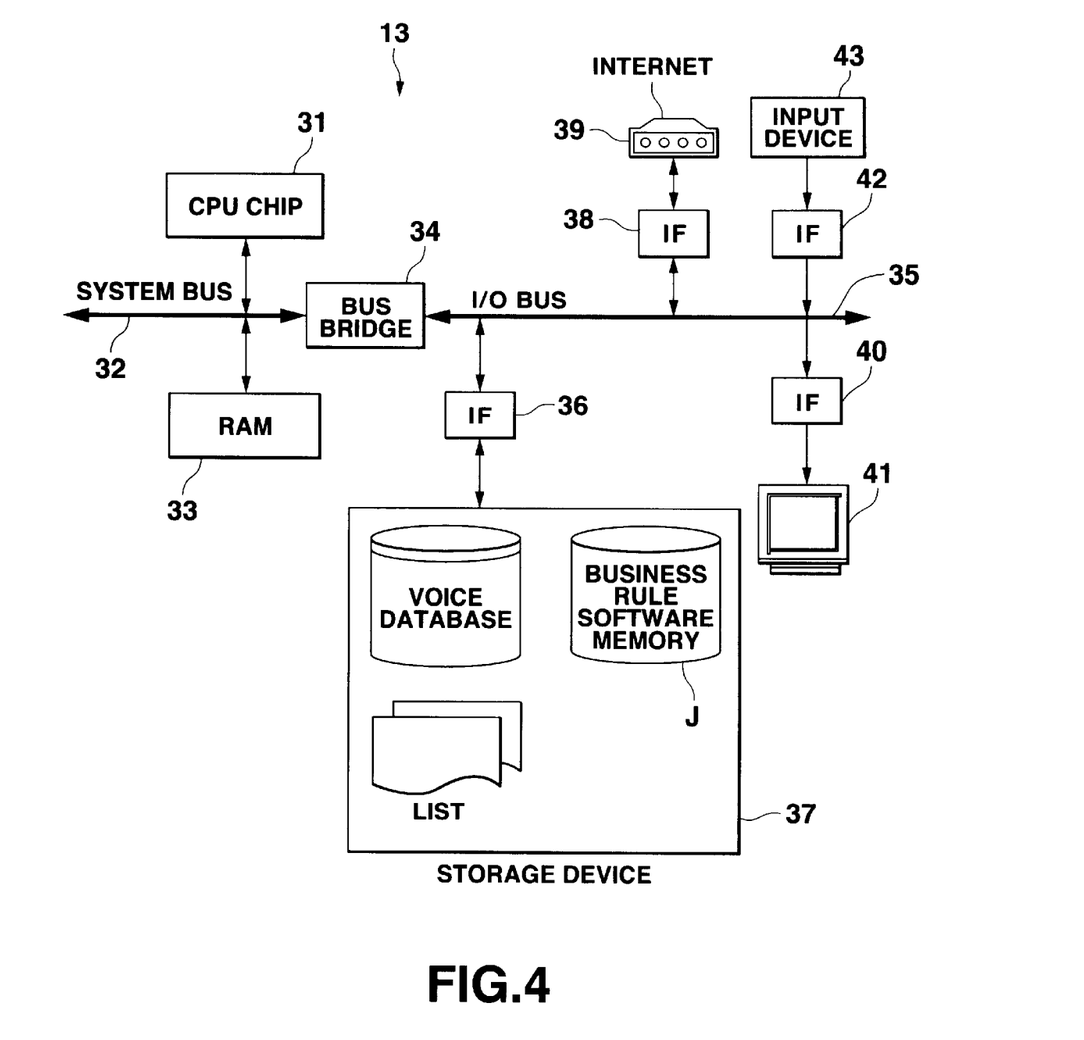
FIG. 4 illustrates a composition of a server of an enterprise.

FIG. 4 illustrates a composition of the server 15 of the enterprise 1. In FIG. 4, the server 15 used is a computer (for example, a UNIX-type computer) having a performance suitable therefor. The server 15 comprises a controller 31 having a CPU chip, which is connected via a system bus 32 to an internal memory 33 including a RAM and to an I/O bus 35 via a bus bridge 34.

The I/O bus 35 is connected via an input/output interface (IF) 36 to a storage device 37; via an input/output interface (IF) 38 to a router 39; via an input/output interface (IF) 40 to a display device such as a CRT or a liquid crystal display 41; and via an input/output interface (IF) 42 to an input device 43 such as a keyboard or a pointing device such as a mouse.

The storage device 37 includes a hard disk, which has an area that has stored data relating the voice data, image data and characters to each other; and personal information on the user 3 who purchased the voice data, and an area that has stored a program realizing a method of selling voice data (business rule software) in the present embodiment. The router 39 is always connected to the Internet 11 for transfer of data.

The server 15 composes means for creating voice data, means for storing the created voice data/image data, means for providing the user with the voice/image data stored in the storing means, and means for providing the user with good voice/image data at the user's request to thereby execute the method of selling the voice data.

A program for realizing the processes performed by the respective means is stored in a predetermined recording medium (for example, CD-ROM). The program stored in this recording medium is installed into a business rule software memory J of the storage device 37 so that the server 15 can execute selling the voice data.

The server 15 may be composed of a single or more machines. The voice data may be sold in a dispersive environment (for example, a plurality of server machines provided at separate positions sell voice data separately via the network).

Figure 5:
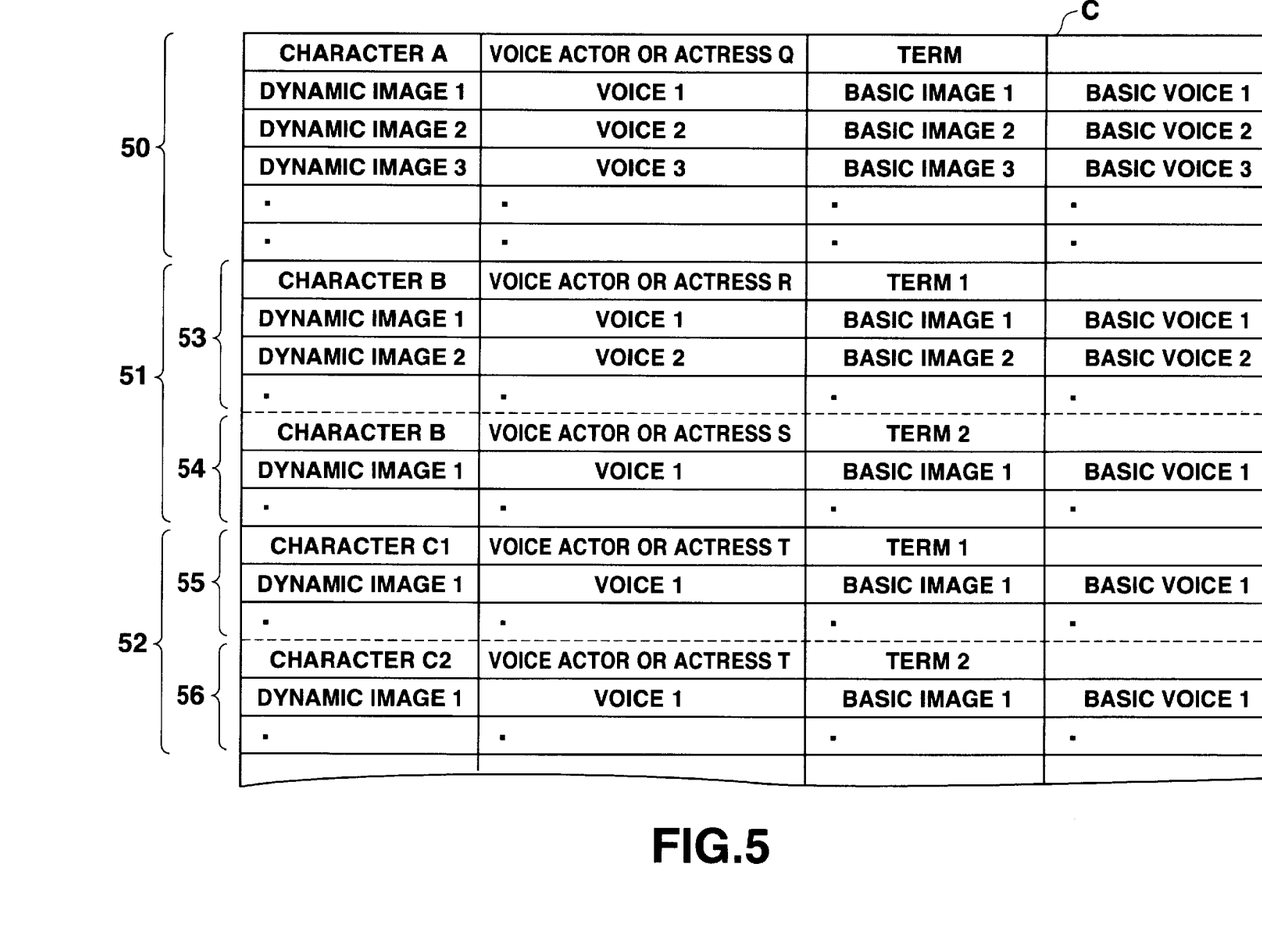
FIG. 5 illustrates a voice database.

FIG. 5 illustrates a storage area of the storage device 37 of the server 15 where the voice database C is stored. In FIG. 5, storage areas 50, 51, 52, . . . are provided in correspondence to characters A, B, C, (characters C1 and C2 in FIG. 5), . . . Data on the names of characters are stored in the storage areas indicated as characters A, B, C1 and C2. In addition, data on (the names of) the voice actors or actresses, data on terms for which the actors or actresses uttered or dubbed the characters' voices (the terms are set, for example, because the quality of the characters' voices can change due to alternation or death of the actor or actress), dynamic image data, voice data, basic image data, and basic voice data are stored on a table. As will be obvious, the actor or actress data, dynamic image data, voice data, basic image data and basic voice data are each provided in a plural form so as to satisfy the user's request in a wide range. In more detail, data on the names of specified persons that are suitable for expressing the voices of characters A, B, C1, C2, . . . are stored as voice data. These specified actors or actresses have uttered their voices as those of the characters and/or dubbed the voices of the characters in movies and animation television broadcasts in the past. In FIG. 5, for example, voice actors or actresses Q, R, S, T, . . . are selected in correspondence to the respective characters.

When for the same character an actor or actress changes places with another or has died, data on those two persons (generally, a plurality of persons) is stored. For example, when there were a term in which a voice actor R dubbed a voice or speech of the character B and a later term in which an actress S dubbed a voice or speech of the character B, a storage area 53 for the actor R and a storage area 54 for the actress S are provided in a storage area 51 of the character B. There is a case in which the actor or actress does not change places with another, but the character itself does. For example, characters appearing in animations can change their outlines to their respective ages. In order to cope with such situation, for example, in the case of the character C, storage areas 55 and 56 are set for unchanged and changed characters C1 and C2.

Although not shown in FIG. 5, there are storage areas that store uttered voices of the same actor or actress different due to his or her ages, and corresponding terms when the different voices were used as the voices of the character. If the same voice actor or actress continues to perform the character, the respective terms may be empty. If different actors or actresses uttered their voices as in the case of the character B, the corresponding terms 1, 2, . . . , for example, are set. Provision of such plurality of terms enables to cope with a changing character. For example, in the case of the character C, the terms where the characters C1 and C2 were used are set.

Dynamic image data 1, 2, 3, . . . stored represent animation images indicating predetermined actions. For example, dynamic image data 1 represents a salutation of a character with a bow; dynamic image data 2 an action or look of the intimately saluting character; and dynamic image data 3 an action of the self-introducing character.

Voice data 1, 2, 3, . . . stored represent voices uttered by corresponding character's dynamic images represented by characters dynamic image data 1, 2, 3, . . . , that is, by corresponding voice actor or actress, when those images indicate their respective actions. For example, voice data 1 of character A stored in the storage area represents data on "Good morning." in the voice of a voice actor Q; and voice data 2 stored in the storage area represents "Good morning. How are you?" in the voice of the actress Q.

Basic image data 1, 2, 3, . . . stored in the corresponding storage area each includes basic image data for creating an animation image representing any particular action of each character; for example, a smiling face, a crying face; a walking, running or sitting figure of the character.

Basic voice data 1, 2, 3, . . . stored each represent basic digital voices data used for creating a voice of a character; that is, vowel data (a, e, i, o, u), consonant data or voiced consonant data.

As will be described later, those basic image and voice data are required to create any particular action of the desired character and a voice of a voice actor or actress uttered to the particular action of the desired character.

Figure 6:
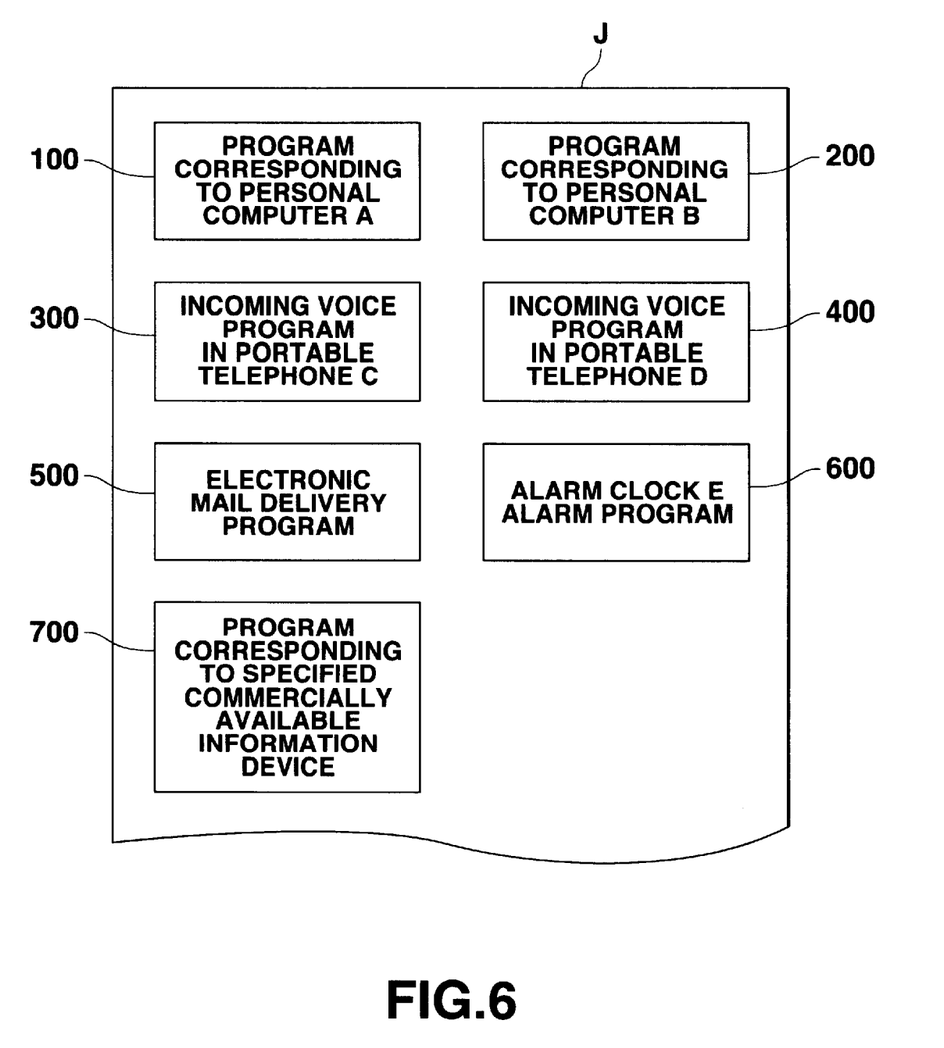
FIG. 6 illustrates a list of character voiced programs.

FIG. 6 illustrates a part of programs stored in an area of a business rule software memory J of storage device 37. In order to cause image and voice data, which the user purchased from the enterprise 1, to be active in the information terminal, a corresponding program is required. In the present embodiment, data on this program can be downloaded from the memory J of FIG. 6. For example, a program 100 corresponding to a personal computer A that is the user's terminal 3a is used to display an image data of a character on a display screen of personal computer A and to output a voice of the character (hereinafter referred to as character voiced program) when the personal computer A is started up. Similar other character voiced programs are stored in the memory J so that any user can get a desired one for pay, for example, by downloading through the Internet 11 from the server 15 (or in the form of a recording medium) on his or her information terminal 3a for using purposes.

Such programs are as follows:

Program 100 corresponding to personal computer A
  When personal computer A is started up as information terminal 3a, this program is used to display a character's image and to output the character's voice;

Program 200 corresponding to personal computer B:
  When a folder is opened on a display screen of personal computer B as information terminal 3a, this program is used to display a character's image and to output the character's voice;

Program 300 reporting in voice an incoming call in portable telephone C;
  When there is an incoming call in portable telephone C as information terminal 3a, this program is used to display a character's image on a display screen of the portable telephone and to output the character's voice;

Program 400 reporting an incoming call in portable telephone D:
  When there is an incoming call in portable telephone D (for example, different in performance from portable telephone C), this program is used to display a character's image on a display screen of the portable telephone and to output the character's voice;

Electronic mail delivery program 500:
  When the user receives an electronic mail at information terminal 3a and opens it, this program is used to display the character's image on this display screen of the terminal and to output the character's voice;

Program 600 for producing an alarm dock E alarm:
  When a set alarm time is reached, using an alarm dock E function in information terminal 3a, this program is used to display the character's image on the display screen of information terminal 3a and to output the character's voice; and Program 700 corresponding to a specified commercially available information device:
  When a specified commercially available information device as information terminals 3a is suitable for fulfilling the functions of this program, this program is used in this information device to display the character's image on the cup display screen thereof and to output the character's voice.

FIG. 6 only illustrates one example. The server 15 may beforehand prepare character-voiced programs other than those shown in FIG. 6.

Figure 7:
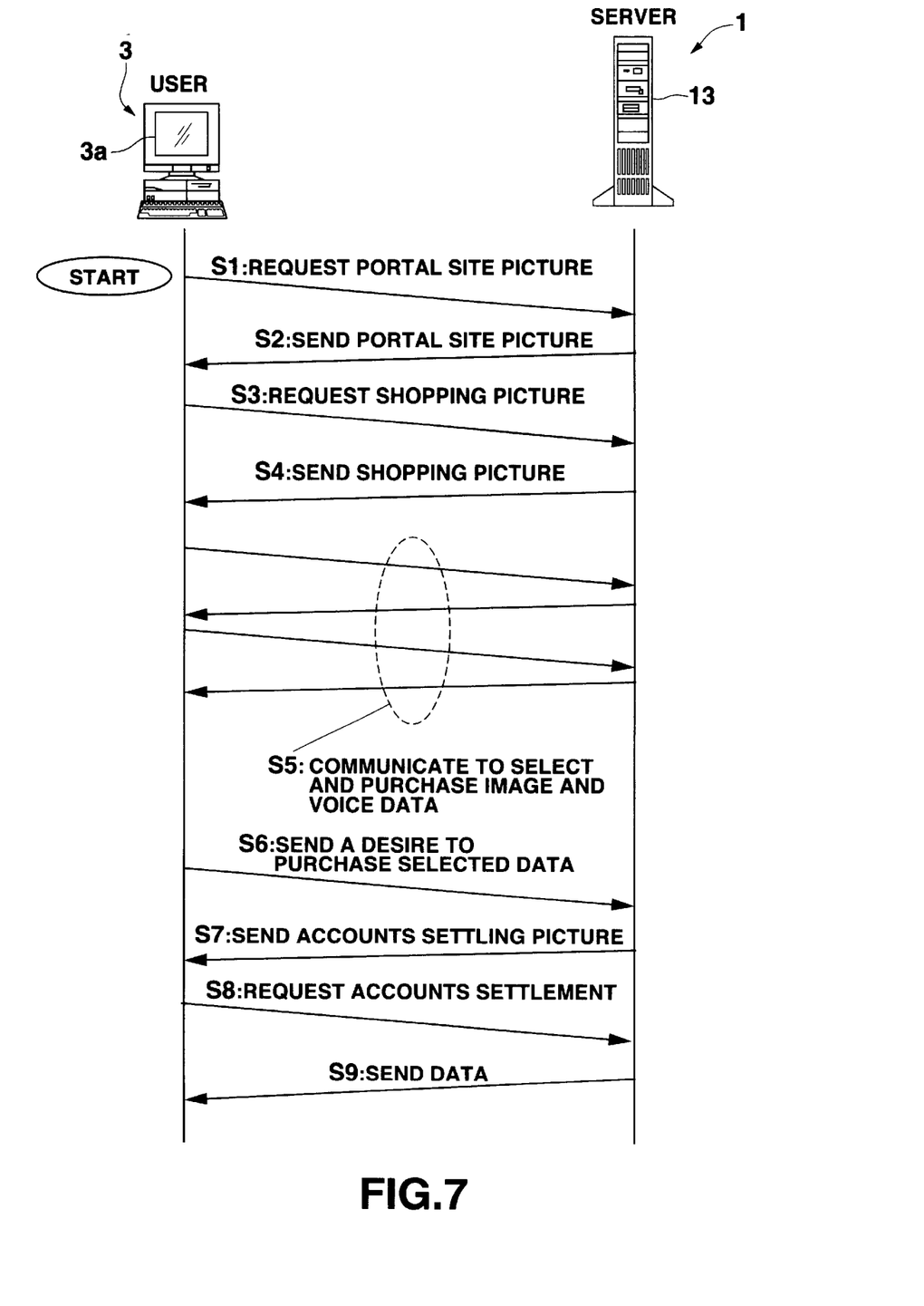
FIG. 7 illustrates a process for selling voice data.

A process in which the user 3 purchases the character's voice and image data (and possibly character-voiced programs) from enterprise 1 will be described next. FIG. 7 illustrates the form of an inter-process communication (time line) taken when a voice data sales service is performed.

First, the user 3 connects the information terminal 3a to the Internet 11, and requests the server 15 of the enterprise 1 to show a portal site picture representing a voice data sales service (step S1). In response, the server 15 sends the portal site picture to the user 3 (step S2). The user 3 then requests the server 15 to send the user a shopping picture for the voice data sales service (step S3). In response, the server 15 sends the picture to the user 3 (step S4). Thus, the shopping picture is displayed on the user's information terminal 3a.

A process for performing direct access to the site of the voice data sale service may be employed, instead of requesting the shopping picture through the portal site from the server 15. Data transmission is performed several times through the inter-process communication between the user 3 and the server 15 for the user 3 to select and purchase a character's voice and image data (step S5).

Figure 8:
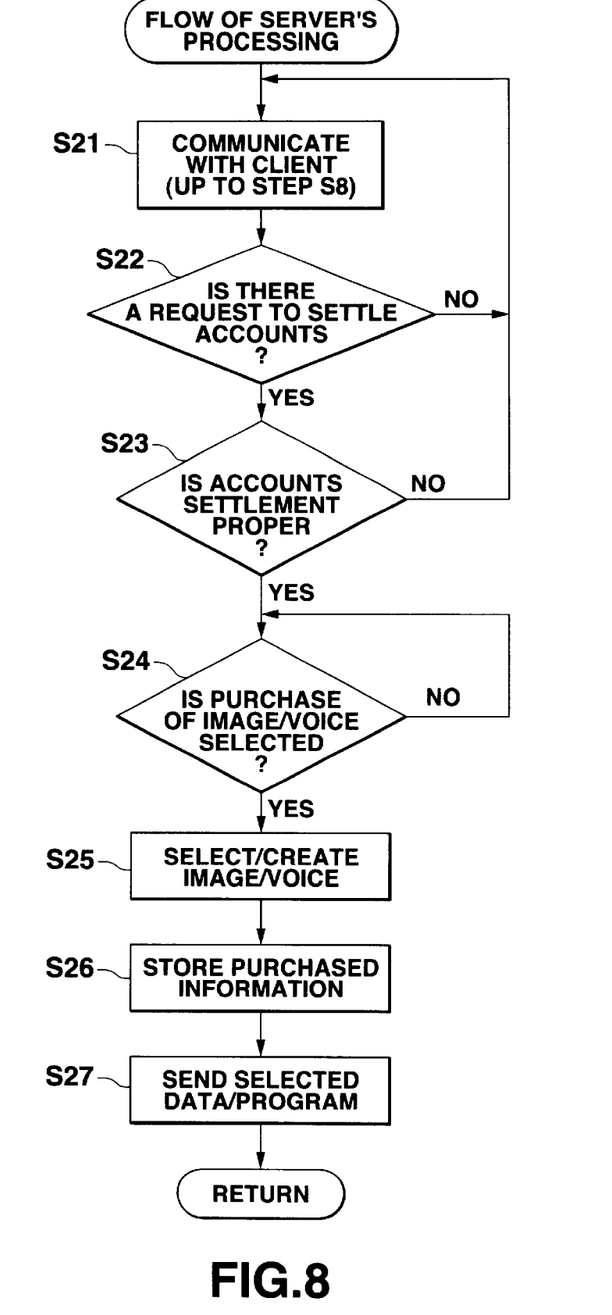
FIG. 8 illustrates a flow of server's processing.

The user 3 then sends the server 15 electronically a desire to purchase the selected data (step S6). The server 15 then sends accounts settling picture to the user (step S7). By viewing the picture, the user 3 sends accounts settling request to the server 15 (step S8). In response, the server 15 sends the user back data necessary for selling voice data, the details of which is shown in FIG. 8 (step S9). FIG. 8 illustrates a flow of the processing performed by the server 15. In FIG. 8, step S21 performs the processing of the server 15 corresponding to steps S1–S8 of FIG. 7. Step S22 determines whether there is a request for settlement of accounts from the user 3. If otherwise, the control returns to step S21 to iterate the looping operation concerned. If there is the request for settlement of accounts from the user 3, the control passes to step S23 to determine whether the accounts settling method is proper (or OK). As described above, there are several accounts settling methods. Here, it is determined whether the accounts have been settled in one account settling method selected by the user 3. For example, if the settlement of accounts by card is used and all the data recorded on the card including the card No. are OK, it is determined that the accounts settling method is proper. If the accounts setting method is improper (NO) in step S23, the control returns to step S21 to iterate the looping process concerned. If YES in step S23, the control passes to step S24, which determines whether the user 3 selected image and voice data of a character (in a purchase mode) and if otherwise, waits until the user does.

Figure 9A:
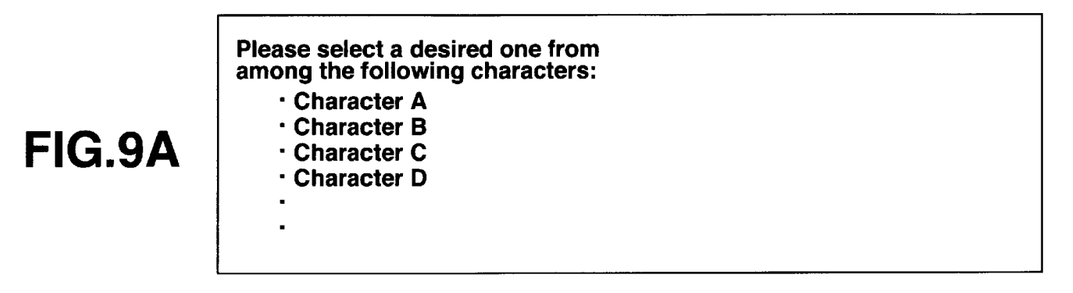
FIG. 9 illustrates a character select picture.

If the user does, the control passes to step S25 to perform selection and creation of image and voice data. In this process, a picture of FIG. 9A is displayed on the user's terminal 3a. FIG. 9A shows a picture to select a character from among characters A, B, C, D, . . . that are displayed therein. The user 3 selects a desired character in the picture, for example, by applying a pointer of a mouse to a desired character and then clicking the mouse or by filling in, for example, a blank that may be provided in the picture with one of codes A, B, C, D, . . . specifying the desired character.

Figure 9B:
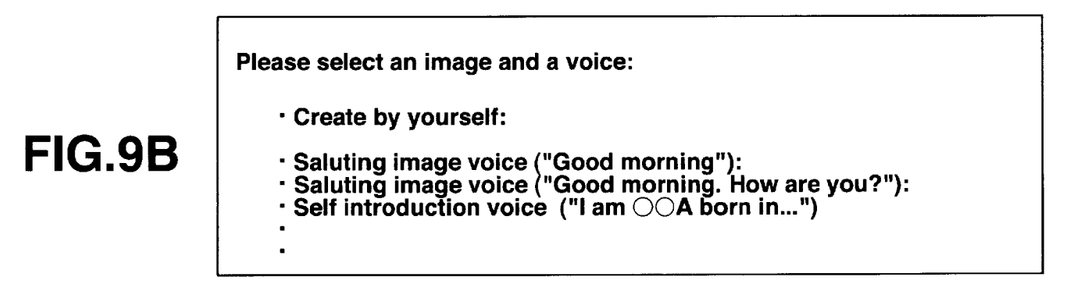

When selection of the character ends, a picture of FIG. 9B appears, which is for selecting an image and voice of the character. In this case, the user 3 can either create or obtain by himself or herself an image and voice of the character by specifying any particular act and voice of the character or select desired data from among already prepared image and voice data.

This latter method is performed as follows. When the user 3 selects a character in FIG. 9A, a picture of FIG. 9B displays data indicative of the contents of dynamic image data 1, 2, 3, . . . and voice data 1, 2, 3, . . . of the selected character stored in the voice database C of the storage device 37 shown in FIG. 5. When the user selects, for example, character A in FIG. 9A, the picture of FIG. 9B displays the contents of the following images and voices of the character A:

A salutation image of character A (dynamic image data 1), a voice "Good morning." (voice data 1);

A salutation image of the character A (dynamic image data 2), a voice "Good morning. How are you?" (voice data 2); and A self-introducing image of the character A (dynamic image data 3), a voice "I am ○○ born in . . . " (voice data 3).

Although FIG. 9B does not display all data concerned, images and voices of other characters are displayable, for example, by scrolling the picture. When user 3 selects a desired one from the prepared images and voices, the image/voice selecting/creating process in step S25 ends. Step S26 is next.

When the user 3 selects the process where the user 3 creates images and voices by himself or herself, by viewing the picture of FIG. 9B, a picture of FIG. 9C appears which indicates a message "please create images and voices in the following process." with further subsequent messages:

"1. Please input an overall time within 60 seconds."

This time includes a time for which an image of the character A is displayed and its voice is output. The user 3 can set this time within 60 seconds. To this end, for example, the server 15 may provide a blank, using a CGI program, so that the user 3 can fill in the blank with a desired overall time.

"2. Please select a first image."

This causes the user 3 to select a first desired image of the character.

"3. Please select intermediate images." (The user 13 can select up to five successive images.)

This causes the user 3 to select a maximum of five desired intermediate images.

"4. Please select the last image."

This causes the user 3 to select the last image that the user 3 desires.

"5. Please input letters corresponding to voices to be produced."

This causes the user 3 to input letters, for example into a blank, to produce a voice of the character.

Figure 9C:
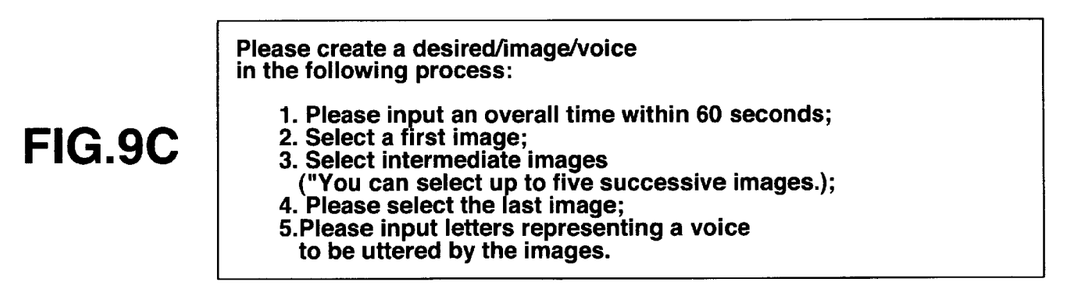

When the user 3 selects the process in which the user 3 creates images and voices of the character by viewing the picture of FIG. 9C, the server 15 displays many basic image data 1, 2, 3, . . . of the character A stored on the table of FIG. 5, and causes the user 3 to select desired ones sequentially. Finally, the user 3 is caused to key in letters the contents of voices that the user 3 desires.

When the user 3 completes selection of the desired image data by himself or herself in this way, the server 15 combines the selected first, intermediate and last image data, that is, interpolates intermediate images each between adjacent selected images so as to provide a series of smooth actions of an overall image. In addition, voice data is created with basic voice data 1, 2, 3, . . . of the storage area 50 of FIG.

5 so that voices of produced by the input letters become a voice of a voice actor or actress Q representing a voice of the character A.

Figure 10:
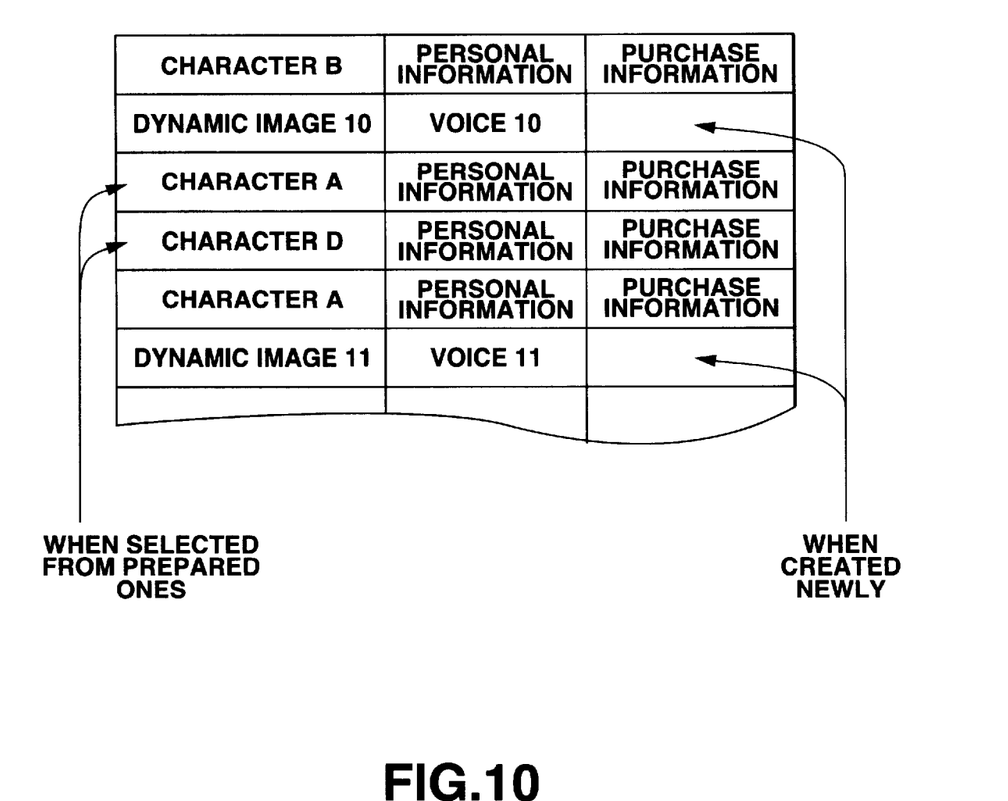
FIG. 10 illustrates records of purchase information.

When this selecting process in step S25 is terminated, the control then passes to step S26 to store purchase information, as shown in FIG. 10, in an area of the voice database C of the server 15. As shown in FIG. 10, when the user 3 purchases image and voice data of a character, data on the purchased character, the user's personal data (for example, his or her name, address, age, sex, etc.), purchase data (for example, purchase date and price, method of accounts settlement, and purchased image and voice data (selected from prepared ones) are sequentially stored. For example, when the user 3 purchases dynamic image data 10 and voice data 10 of the character B, data on the character B, its personal information, purchase data, the dynamic image data 10 and its voice data 10 are stored as a record unit.

Such purchase records are recorded sequentially with time so that newer records are disposed more downward in the picture of FIG. 10. In the example of purchase records of FIG. 10, characters B, A, D and A are illustrated as being purchased in this order. In this case, the record area of character B illustrates that the user 3 created image and voice data by himself or herself. The created image and voice data are recorded successively in the record area of character B, as shown by an arrow. In addition to forming a part of a history of data purchase of the user 3, such data are recorded for other users so that when one of those users orders the image and voice data of the same character B these data can be used. This applies when the user 3 created by himself or herself image and voice data of the character A as a fourth purchase record. These data are recorded successively in the appropriate record areas of character A, as shown by arrows.

The second and third purchase records of the characters A and D comprising their personal information and purchase data are selected and purchased by the user 3 from among the prepared image and voice data.

When the process for storing the purchased information in step S26 is terminated, the server sends the selected data and program to the user 3 in step S27. The selected data includes the image and voice data of the character selected or created by the user 3. The selected program is the character voiced program selected by the user 3. If the user 3 selects no character voiced program, C no data is sent in step S27.

When the user 3 selects the character voiced program, a picture displaying a list of character voiced programs is displayed on the user's information terminal 3a. By viewing this picture, the user 3 determines purchase of a desired character voiced program.

When the server performs the processing in step S27, the user 3 downloads on his or her information terminal 3a the image and voice data selected or created by the user 3. When the user 3 has selected the character voiced program, the user 3 also downloads the program similarly. After step S27, the control returns to step S21 to iterate the routine concerned.

As described above, the user 3 can download desired image and voice data of a desired character easily over the network and as requested a character voiced program. For example, if an electronic mail delivery program is downloaded as the character voiced program and stored in the information terminal 3a, and an electronic mail is received and opened in the information terminal 3a, an image of the character is displayed on the display screen and the voice of the character is output. Thus, the user 3 can recognize and enjoy the character personally.

Modifications of the embodiment will be described next:
a) While in the embodiment the voice and image data of the character and the character voiced program are illustrated as being available for pay, particular samples of those data may be free for introducing purposes.
b) The voice and image data of the character and the character voiced program to be purchased by the user can be delivered over the network and in recording mediums including a voice IC chip for reproducing purposes.
c) A membership system may be constructed in which only the members who have contracted to obey the rules of the system on the network can purchase desired image and voice data of a desired character and a character voiced program.
d) The image and voice data of the character and the character voiced program to be sent to the user may be ciphered.
e) The character voiced program may take a simplified form compared to the programs of the embodiment, for example, so as to be applied to a door phone and/or a door chime.
f) While in the embodiment the Internet is illustrated as being used by the user to access the enterprise therethrough, the present invention is not limited to this particular case. For example, the user may use a facsimile device to access an enterprise over general public lines (corresponding to the network) to purchase desired voice/image data of a desired character and a character voiced program. Alternatively, the user may access the enterprise using a general fixed telephone over the general public lines and request to purchase such data (for example, to this end, a system may be provided in which the user can request to purchase such data, using a push tone such as a DTMF signal).

According to the present invention, although the voice of a particular person who creates or utters the voice of a character changes with time and has a limited life, data on constant-quality voices uttered as the voice of the character by the particular person to a look and behavior of the character can be sold to the user. The constant quality voice data means that even when the voice itself of the specified person changes, for example with time or age, that is, even when the specified person dies, the voice data created and held by the enterprise does not change with time and the constant quality voice of the character can be used for a long time.

According to the present invention, the character's minute voice data which the user desires and which is expressed to a look and/or behavior of the character compared to the prepared voice data can be created from the basic voice data prepared beforehand and sold to the user.

According to the present invention, a program that can reproduce voice and image data related to a character in the user's information terminal is sold. Thus, the user can get the program and greatly enjoy the voice and image of the character in his or her information terminal when the program is executed.

What is claimed is:

1. A voice data selling method comprising:
   storing in a storage device (i) basic voice data representing a basic voice expressed by a specified person for an image of a predetermined character, and (ii) image data representing the image of the predetermined character, in a corresponding relationship;
   providing a user with the image data and the basic voice data of the predetermined character;

creating voice data desired by the user and representing a voice uttered for the predetermined character based on the basic voice data at a request of the user; and selling the created voice data and the image data of the predetermined character.

2. A voice data selling method, comprising:

storing beforehand in corresponding relationship in a storage device (i) a plurality of image data each representing an image of at least one of a look and behavior of a predetermined character, and (ii) a plurality of basic voice data each representing a voice of a specified person uttered corresponding to the at least one of the look and behavior of the predetermined character;

providing a user with a plurality of images each representing the at least one of the look and behavior of the predetermined character, causing the user to select at least one image from among the provided plurality of images;

causing the user to input letter data representing a voice to be uttered by the selected at least one image;

creating voice data corresponding to the letter data inputted by the user from the plurality of basic voice data; and selling the created voice data of the predetermined character.

3. The voice data selling method according to claim 2, further comprising:

storing beforehand a program to reproduce a voice and an image represented by the voice data and the image data in an information terminal of the user;

downloading the program on the information terminal of the user at a request of the user; and reproducing the voice and image of the predetermined character in the information terminal of the user in response to the program being executed in the information terminal of the user.

4. The voice data selling method according to claim 2, wherein the predetermined character comprises a character of an animation expressed in one of a movie, a television broadcast and a commercially available video recording medium, and wherein the voice data of the character comprises voice data of a voice actor or actress who dubs a voice or speech of the character of the animation.

5. A voice data selling system comprising:

a storage device having stored therein (i) image data representing at least one of a look and behavior of a predetermined character, and (ii) basic voice data representing a voice uttered by a specific person for the at least one of the look and behavior of the predetermined character;

means for providing over a network the image data and the basic voice data of the predetermined character stored in said storage device to a user;

means for creating voice data representing a voice of the predetermined character uttered for any one of the look and behavior of the predetermined character from the basic voice data of the specified person stored in said storage device at a request of the user; and means for selling the created voice data of the predetermined character.

6. A voice data selling system, comprising:

a storage device having stored beforehand in a corresponding relationship (i) a plurality of image data each representing an image of at least one of a look and behavior of a predetermined character, and (ii) a plurality of basic voice data each representing a voice of a specified person uttered for the at least one of the look and behavior of the predetermined character;

means for providing a user with a plurality of images each representing the at least one of the look and behavior of the predetermined character;

means for causing the user to select at least one image from among the provided plurality of images;

means for causing the user to input letter data representing a voice to be uttered by the selected at least one image;

means for creating voice data corresponding to the letter data inputted by the user from the plurality of basic voice data; and means for selling the created voice data of the predetermined character.

7. The voice data selling system according to claim 6, further comprising:

a program data storage device having stored beforehand a program to reproduce a voice and an image represented by the voice data and the image data in an information terminal of the user; and means for downloading program data on the information terminal of the user at a request of the user.

8. The voice data selling method according to claim 6, wherein the predetermined character comprises a character of an animation expressed in any one of a movie, a television broadcast, and a commercially available video recording medium, and wherein the voice data of the character comprises voice data of a voice actor or actress who dubs a voice or speech of the character of the animation.

* * * * *